Jan. 26, 1960 D. RICHMAN 2,922,839

AUTOMATIC-CHROMINANCE-CONTROL SYSTEM

Filed Nov. 16, 1956

2 Sheets-Sheet 1

Jan. 26, 1960 D. RICHMAN 2,922,839

AUTOMATIC-CHROMINANCE-CONTROL SYSTEM

Filed Nov. 16, 1956 2 Sheets-Sheet 2

United States Patent Office 2,922,839

Patented Jan. 26, 1960

2,922,839

AUTOMATIC-CHROMINANCE-CONTROL SYSTEM

Donald Richman, Fresh Meadows, N.Y., assignor to Hazeltine Research, Inc., Chicago, Ill., a corporation of Illinois Application November 16, 1956, Serial No. 622,703

7 Claims. (Cl. 178—5.4)

*General*

Figure 1:
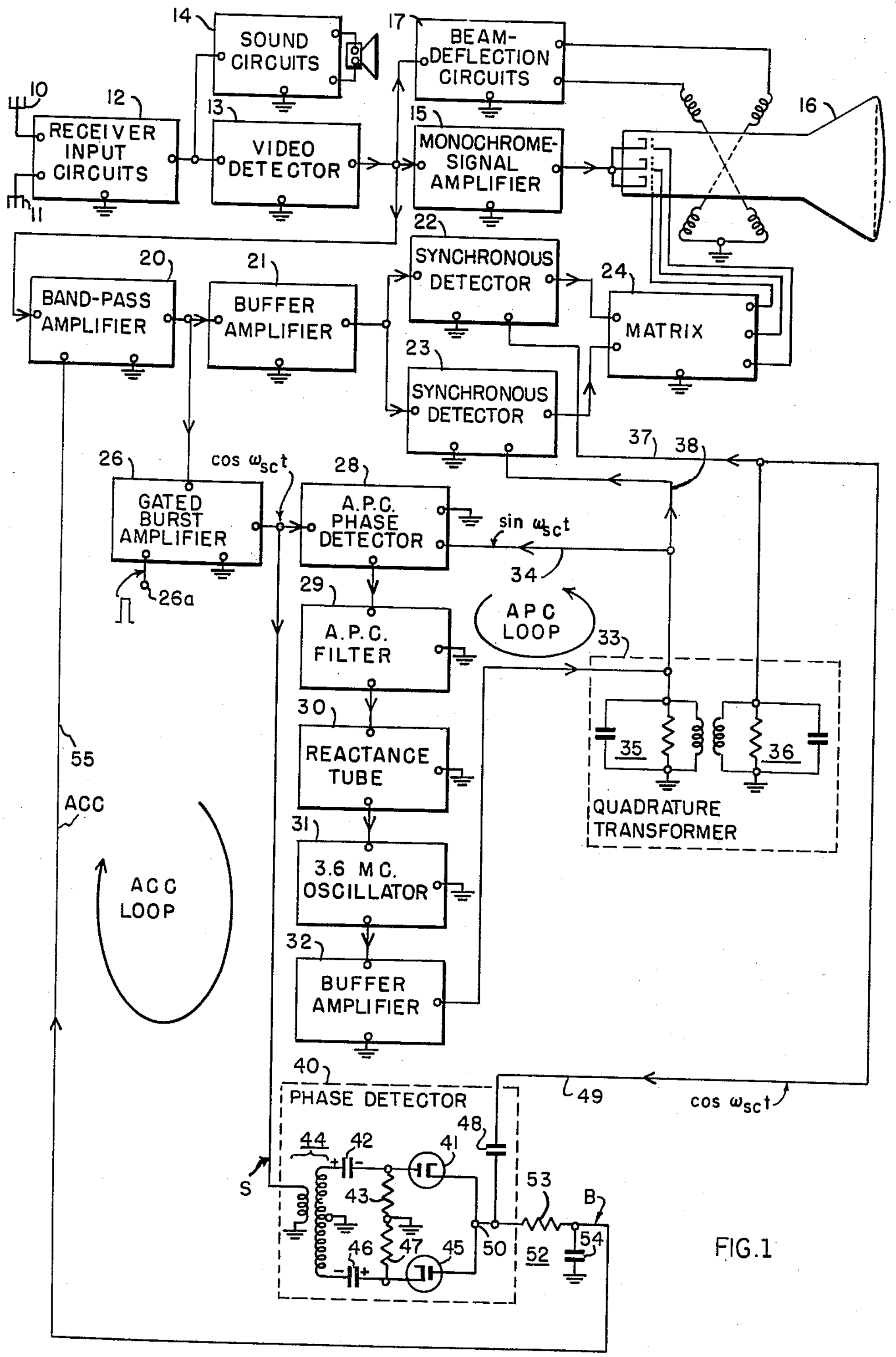

This invention relates to signal-translating apparatus for use in the color-signal or chrominance-signal decoder of a color-television receiver and, particularly, to automatic-chrominance-control (ACC) systems for use in such signal decoders to stabilize the gain of the chrominance signal.

Automatic-chrominance-control (ACC) in the chrominance channel of a color receiver has the same purpose as automatic-gain-control (AGC) in a black-and-white television receiver and automatic-volume-control (AVC) in a sound receiver, namely, to hold a signal gain relatively constant. In color receivers, it is customary to utilize an AGC system for automatically controlling the gain of the radio-frequency and intermediate-frequency amplifiers. This serves to stabilize the gain of the monochrome portion of the color signal. A separate gain-control system, in this case an ACC system, is, nevertheless, needed to further control the gain of the chrominance signal to compensate for variations in the gain of such chrominance signal relative to the monochrome signal. Such variations arise because the monochrome- and chrominance-signal components are primarily located at opposite ends of the band. As a result, variations in antenna impedance match with frequency or variations in signal strength due to multipath transmission may produce variations between the gains of the monochrome and chrominance signals.

It has been heretofore proposed to obtain automatic-chrominance-control by having at least one amplifier stage in the chrominance-signal channel pass both the chrominance-signal proper and the subcarrier synchronizing burst and then to separate and rectify the burst to obtain an ACC bias which is then supplied back to the amplifier stage to control the gain thereof. This form of gain-control system serves to stabilize or hold relatively constant the gain of the chrominance signal because the gain of the synchronizing burst also determines the gain of the chrominance signal transmitted through the common amplifier stage. One form of ACC system heretofore proposed utilizes an envelope detector circuit to rectify the subcarrier synchronizing burst. Such envelope detection has certain disadvantages that will be discussed.

In order to obtain proper decoding or demodulation of the chrominance signal, it is necessary that properly phased reference signals of subcarrier frequency be supplied to the chrominance-signal demodulators. Accordingly, in one form of receiver the chrominance-signal decoder also includes a local oscillator the phase of which is properly determined by synchronizing the oscillator with the received subcarrier synchronizing burst. Because both the ACC system and the oscillator control means utilize the subcarrier synchronizing burst, the construction and operation of each are generally much dependent on those of the other.

It has been heretofore proposed to properly synchronize the operation of the local reference-signal oscillator with the received synchronizing burst by utilizing an automatic-phase-control (APC) system which compares the output of the local oscillator with the received synchronizing burst to develop a control signal which is then used to control the local oscillator. The design of such automatic-phase-control (APC) systems is considerably complicated by the conflicting requirements that the systems be largely immune to noise while at the same time the systems have a minimum of pull-in time and an adequately large pull-in range. This problem and its conflicting requirements are discussed in detail in a technical paper by applicant entitled "Color-Carrier Reference Phase Synchronization Accuracy in NTSC Color Television" which appears at page 106 of the January 1954 issue of the Proceedings of the I.R.E. It is therein pointed out that the conflicting requirements may be adequately fulfilled by utilizing a two-mode synchronizing or phase-control system which affords maximum noise immunity when the system is properly synchronized while affording a minimum pull-in time and a maximum pull-in range when the system is not properly synchronized. One form of two-mode synchronizing system is discussed in detail in another paper by applicant entitled "The D.C. Quadricorrelator: A Two-Mode Synchronization System" appearing at page 288 of the January 1954 issue of the Proceedings of the I.R.E. Such systems as well as the problem overcome thereby are also discussed in chapter 10 of a book entitled Principles of Color Television by The Hazeltine Laboratories Staff, published by John Wiley & Sons, Inc., New York, 1956. As mentioned in these references, one way of improving the pull-in time and range of an APC system is to increase the sensitivity thereof by increasing the effective amplitude of the subcarrier synchronizing burst supplied thereto. Such amplitude is affected by the control action of the ACC system.

It has been previously proposed to utilize a form of balanced diode type of phase detector in the APC system to develop the control signal for controlling the local oscillator. Such a balanced diode phase detector comprises essentially two detector circuits differentially coupled to be balanced in the absence of a phase deviation. Accordingly, it has been heretofore proposed to additionally use one of the detector circuits of such a phase detector as an envelope detector for rectifying the subcarrier synchronizing burst to develop the ACC bias. It has also been proposed to use instead a separate and independent envelope detector circuit for rectifying the burst. Envelope detector circuits of either type, however, have the disadvantage that the gain of the ACC system is maintained largely independent of the state of synchronism of the APC system. In particular, where half of the APC phase detector is utilized as the ACC rectifier, the resulting ACC bias may actually reduce the gain of the synchronizing burst during periods when the APC system is not in synchronism. It would, on the other hand, be highly desirable to increase the burst gain during periods when the APC system is not in synchronism as this would render the APC system more sensitive and would substantially reduce the required pull-in time.

Another disadvantage of envelope-type detector circuits heretofore proposed for use in ACC systems is that such detector circuits tend to charge up in the presence of electrical noise and, hence, develop a control bias which is not properly representative of the true signal amplitude. It would be desirable, therefore, to have an ACC system that is less sensitive to electrical noise.

It is an object of the invention, therefore, to provide a new and improved automatic-chrominance-control system for use in the chrominance-signal decoder of a color-television receiver.

It is another object of the invention to provide a new and improved automatic-chrominance-control system wherein the gain-control action is effective to enable improved performance of the APC system.

It is a further object of the invention to provide a new and improved automatic-chrominance-control system wherein the gain-control action is automatically controlled in accordance with the state of synchronization of the APC system to enable the subcarrier synchronizing burst to have enhanced gain when the APC system is not synchronized.

It is yet another object of the invention to provide a new and improved automatic-chrominance-control system which is less sensitive to noise.

In accordance with the invention, an automatic-chrominance-control system takes the form of a two-mode signal-translating apparatus for use in the chrominance-signal decoder of a color-television receiver. Such apparatus includes a chrominance-signal channel for translating a received chrominance signal including the subcarrier synchronizing bursts. The apparatus also includes, as part of the chrominance-signal decoder, an automatic-phase-control loop coupled to the channel and responsive to the subcarrier synchronizing bursts and including a controlled oscillator circuit for generating a subcarrier reference signal in synchronism with the bursts. The apparatus further includes a synchronous phase detector coupled to both the chrominance-signal channel and the oscillator circuit for combining the synchronizing bursts and the reference signal to develop a control potential representative of the burst amplitude during an in-sync operating mode which occurs when the oscillator circuit is in synchronism with the bursts and to develop substantially no control potential during an out-of-sync operating mode which occurs when the oscillator circuit is not in synchronism with the bursts. The apparatus additionally includes circuit means for coupling the output of the phase detector back to the chrominance-signal channel to control its gain so that the control potential developed during the in-sync operating mode serves to stabilize the gain of the chrominance signal and the absence of any substantial control potential during the out-of-sync operating mode serves to increase the sensitivity of the automatic-phase-control loop by enabling the chrominance-signal channel to supply thereto subcarrier synchronizing bursts of increased amplitude.

For a better understanding of the present invention, together with other and further objects thereof, reference is had to the following description taken in connection with the accompanying drawings, and its scope will be pointed out in the appended claims.

Figure 2:
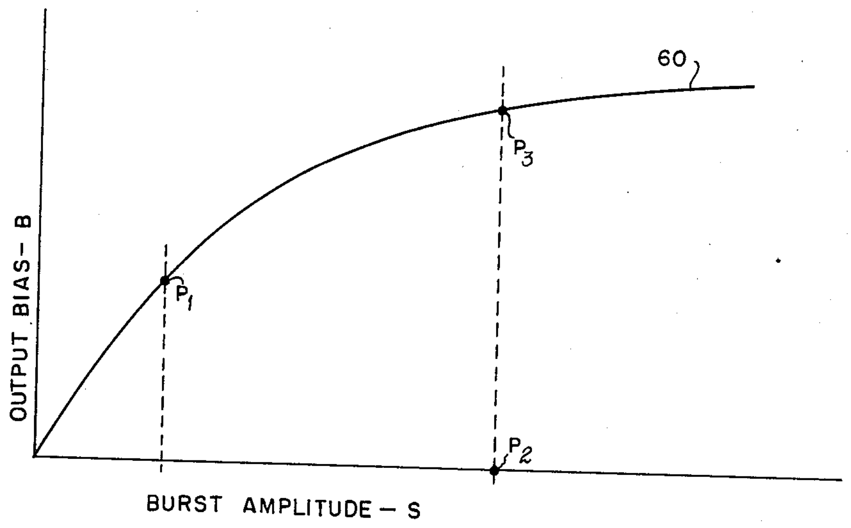

Referring to the drawings:

Fig. 1 is a circuit diagram, partly schematic, of a representative embodiment of a color-television receiver including a representative embodiment of an automatic-chrominance-control system constructed in accordance with the present invention, and Fig. 2 is a graph utilized in explaining the operation of the automatic-chrominance-control system of Fig. 1.

*Color receiver of Fig. 1*

Referring to Fig. 1 of the drawings, there is shown a representative embodiment of a color-television receiver. The received color-television signal is supplied by way of an antenna system 10, 11 and receiver input circuits 12 to a video or second detector 13. The receiver input circuits 12 may include the usual radio-frequency amplifier, frequency converter, and intermediate-frequency amplifier. Sound circuits 14 may be coupled to the output of unit 12.

The monochrome portion of the detected color signal is applied by way of a monochrome-signal amplifier 15 to the cathodes of a color picture tube 16 of, for example, the three-gun shadow-mask type. The line- and field-synchronizing pulses contained in the detected composite color signal are supplied to beam-deflection circuits 17 for controlling the generation of the usual scanning wave forms for producing the scanning raster of the picture tube 16.

The chrominance-signal portion of the composite detected signal as well as the subcarrier synchronizing bursts are supplied by way of a band-pass amplifier 20 to a further amplifier 21. The chrominance signal is then applied to a pair of synchronous detectors 22 and 23. Locally generated reference signals of subcarrier frequency, namely 3.6 megacycles, and which are in phase-quadrature with one another are also supplied to the synchronous detectors 22 and 23 and serve to control the operation thereof so that a pair of color-difference signals is derived from the chrominance signal. These color-difference signals are then supplied to a matrix 24 for producing the red, green, and blue color-difference signals which are, in turn, supplied to the individual control electrodes of the color picture tube 16. Such picture tube is then effective to combine these color-difference signals with the monochrome signal applied to the cathodes to produce the desired color image on the display screen of the tube 16.

The locally generated reference signals supplied to the synchronous detectors 22 and 23 are obtained from a controlled oscillator circuit which is maintained in synchronism with the subcarrier synchronizing bursts by means of an automatic-phase-control system or APC loop. This portion of the color receiver will be discussed more in detail hereinafter.

*Description of ACC system of Fig. 1*

Considering now the automatic-chrominance-control system of Fig. 1, such system constitutes a representative embodiment of an automatic-chrominance-control (ACC) system constructed in accordance with the present invention. As mentioned, the ACC system takes the form of a two-mode signal-translating apparatus for use in the chrominance-signal decoder of a color-television receiver. Such apparatus comprises a chrominance-signal channel for translating a received chrominance signal including the subcarrier synchronizing bursts. Such channel is represented, for example, by the band-pass amplifier 20 of Fig. 1. The apparatus may further include a gated amplifier circuit coupled to the output of the chrominance-signal amplifier 20 for separating and translating the subcarrier synchronizing bursts. This gated amplifier circuit is represented by a gated burst amplifier 26 the operation of which may be gated by supplying suitable flyback pulses thereto from the beam-deflection circuits 17 by way of a terminal **26*a***.

The apparatus of the present invention also includes an automatic-phase-control (APC) loop coupled to the channel and responsive to the subcarrier synchronizing bursts and including a controlled oscillator circuit for generating subcarrier reference signals in synchronism with the burst. The APC loop may include an APC phase detector 28, an APC filter 29, a reactance tube 30, a 3.6 megacycle oscillator 31, a buffer amplifier 32, and a quadrature transformer 33, these units being coupled in cascade. The latter three units, namely units 31, 32, and 33, make up the controlled oscillator circuit for generating the subcarrier reference signals. One input terminal of the APC phase detector 28 is coupled to the output of the gated amplifier circuit 26 while another input terminal of the detector 28 is connected to the controlled oscillator circuit by way of a conductor 34. The APC phase detector 28 may take the form of any of the commonly known types of synchronous detector circuits and may, for example, take the form of a double-diode detector circuit similar to phase detector 40 which will be considered presently. The quadrature transformer 33, which includes a pair of electromagnetically coupled tuned circuits 35 and 36, serves to develop a pair of quadrature-phased subcarrier reference signals which are supplied by conductors 37 and 38 to the synchronous detectors 22 and 23, respectively.

The apparatus of the present invention also includes a phase detector coupled to both the chrominance-signal channel 20 and the oscillator circuit, represented by units 31—33, for combining the synchronizing bursts and one of the reference signals to develop a control potential representative of the burst amplitude during an in-sync operating mode which occurs when the oscillator circuit is in synchronism with the bursts and to develop substantially no control potential during an out-of-sync operating mode which occurs when the oscillator circuit is not in synchronism with the bursts. By "control potential" is meant the average direct-current potential developed by the phase detector as a result of comparing the two input signals supplied thereto. In other words, depending on the design of the circuit, a fixed direct-current potential might be superimposed on the ACC potential but such fixed potential should not be considered as part of the ACC potential. Such phase detector may take the form of a phase detector 40, as shown in Fig. 1, in which case the phase detector includes a pair of conductively coupled diode detector circuits. One of the detector circuits includes a diode 41, a condenser 42, a resistor 43, as well as the upper half of the transformer 44 secondary winding. The other detector circuit, on the other hand, includes a diode 45, a condenser 46, a resistor 47, and the lower half of the transformer 44 secondary winding. Each of these detector circuits is individually responsive to both the synchronizing bursts and the reference signal supplied thereto by way of a condenser 48 and a conductor 49 for developing at a point 50, which is common to both detector circuits, a resultant phase- and amplitude-sensitive direct-current control potential during the in-sync operating mode and a substantially fixed direct-current reference potential, such as zero potential, during the out-of-sync operating mode.

With reference to the phase detector 40, it should be noted that either positive or negative polarity direct-current control potentials may be obtained therefrom during the in-sync operating mode depending on the polarity of the synchronizing bursts, the polarity of the locally generated reference signal, and the polarity of the diodes 41 and 45. In other words, assuming that one polarity is developed by the circuit, then the opposite polarity might instead be obtained by reversing either the polarity of the synchronizing bursts reaching the secondary of the transformer 44, by reversing the polarity of the locally generated reference signal supplied by way of condenser 48, or by reversing the diodes 41 and 45. Also, it should be noted that this phase detector which develops the control potential need not take the precise form as represented by the phase detector 40 but may instead take the form of any of the well-known types of amplitude-sensitive synchronous detector circuits which produce an output potential which depends on the phases of a pair of signals applied thereto.

The apparatus of the present invention further includes circuit means for coupling the output of the phase detector 40 back to the chrominance-signal channel 20. In this manner, the control potential developed during the in-sync operating mode serves to stabilize the gain of the chrominance signal and the absence of any substantial control potential during the out-of-sync operating mode serves to permit increased sensitivity of the APC loop by enabling the chrominance-signal channel 20 to supply thereto subcarrier synchronizing bursts of increased amplitude. This circuit means may include a low-pass filter 52 comprising a resistor 53 and a condenser 54. This circuit means may also include a conductor 55 which couples the output of the low-pass filter 52 back to the band-pass amplifier 20.

*Operation of ACC system of Fig. 1*

Before considering the operation of the ACC system proper, it is first necessary to briefly consider the operation of the APC loop. To this end, the subcarrier synchronizing bursts are supplied by way of the band-pass amplifier 20 and the gated burst amplifier 26 to the APC phase detector 28, the time spaced bursts being separated out from the remainder of the chrominance signal by the gated operation of amplifier 26. Also supplied to the APC phase detector 28 is one of the locally generated reference signals developed by the oscillator 31, this signal being supplied back to the APC phase detector 28 by way of the buffer amplifier 32, the primary tuned circuit 35 of quadrature transformer 33, and the conductor 34. The operation of such an APC loop is discussed in detail in the technical articles previously mentioned but, briefly considered, the APC phase detector 28 is effective to combine the subcarrier synchronizing bursts with the locally generated reference signal to develop an output control signal the magnitude of which depends on the relative phase difference between these signals. This control signal is then supplied by way of the APC filter 29 to the reactance tube 30, the reactance tube 30 being effective by virtue of the feedback in the APC loop to control the operating frequency and phase of the oscillator 31. In this manner, the control signal developed by the phase detector 28 causes the oscillator 31 to oscillate in frequency synchronism with the subcarrier synchronizing bursts, but normally 90° out of phase with the burst phase. If the frequency of the oscillator 31 departs from the desired relationship, then the control signal at the output of phase detector 28 operates to bring the oscillator 31 back into synchronism.

The reference signals desired for the operation of the synchronous detectors 22 and 23 are developed by the quadrature transformer 33 in response to the signal supplied thereto by the oscillator 31. This quadrature transformer 33 operates on the principle that a double-tuned coupled circuit produces 90° of phase shift between input and output at resonance. In other words, the signal across the primary tuned circuit 35 is in phase with the signal supplied thereto from the oscillator 31 while the signal developed across the secondary tuned circuit 36 is 90° out of phase therewith.

Considering now the operation of the ACC system proper, such system or loop includes the band-pass amplifier 20 and the gated burst amplifier 26 which, as before, are effective to amplify and separate the subcarrier synchronizing burst portion of the received chrominance signal. The synchronizing bursts are then supplied to the phase detector 40. Also supplied to the phase detector 40 is one of the reference signals developed by the oscillator circuit portion of the APC loop. In this case, however, it is the in-phase reference signal, that is, the reference signal whose phase axis is identical to the phase axis of the synchronizing burst that is utilized. By "phase axis" is meant that the reference signal may be exactly in phase with the burst phase or may be exactly 180° out of phase therewith. For sake of example, however, it shall hereinafter be assumed that the reference signal is exactly in phase with the burst phase provided, of course, that the APC loop is operating in synchronism with the received burst.

As mentioned, the phase detector 40 comprises, basically, a pair of conductively coupled detector circuits. In the absence of any subcarrier synchronizing bursts, the continuous reference signal which is supplied to the phase detector 40 by way of the condenser 48 energizes the two detector circuits equally so that the rectified direct-current potentials across the diodes 41 and 45 balance one another and, hence, the direct-current potential at the common point 50 remains at 0 volts. Now, if the synchronizing bursts are of the same frequency and phase as the locally generated reference signal which occurs when the APC loop is in sync, then this burst as it appears in push-pull fashion across the two halves of the transformer 44 secondary winding combines with the reference signal to produce resultant signals of unequal peak amplitudes across the two detector circuits. In particular, the resultant amplitude across the detector circuit including the diode 45 is increased while that across the other detector circuit including the diode 41 is decreased causing a direct-current potential of negative polarity to appear at the common point 50. The low-pass filter 52 transmits only the average or direct-current potential.

If the frequency of the local reference signal remains the same as the frequency of the burst but the phase departs from the in-phase relationship, then the resultant signals vary sinusoidally with phase. The APC loop, however, holds the phase difference to a small value when the oscillator 31 is in frequency synchronism with the burst.

If, on the other hand, the local reference signal and synchronizing bursts are of different frequencies, then these two signals are continually varying in phase relative to one another. As a result, the potential at the common point 50 is continually varying from one extreme to the other. This potential variation, which is commonly referred to as a "beat note," has such symmetry in wave form about the zero axis that it does not produce a direct-current component. As a result, no direct-current control potential appears at the common point 50. The low-pass filter 52 is effective to block the passage of the beat-note variation so that substantially none of it appears at the output of such filter.

Thus it is seen that when the APC loop is in synchronism with the received synchronizing burst, then a control potential is developed by the phase detector 40 and this control potential may be used as an ACC bias. On the other hand, when the APC loop is not in synchronism with the received burst, then substantially no direct-current control potential is developed by the phase detector 40.

Considering further the case where the APC loop is operating in synchronism, then the magnitude of the direct-current control potential at the common point 50 is representative of the amplitude of the synchronizing bursts supplied to the phase detector 40. This is because variations in the burst amplitude produce corresponding variations in the total magnitude of the rectified potential developed at point 50. The relationship between the burst amplitude "S" and the output bias "B" is represented graphically by curve 60 of Fig. 2. This output bias, which represents the direct-current control potential at the common point 50, serves as an ACC bias and is supplied back to the band-pass amplifier 20 by way of the low-pass filter 52 and the conductor 55. This ACC bias then varies the gain of the band-pass amplifier 20 in a manner inverse to the amplitude of the synchronizing bursts. In other words, the ACC bias is supplied back to the band-pass amplifier 20 in a degenerative manner. For the case of a negative polarity ACC bias, such bias might, for example, be supplied to the control grid of an electron tube included in the band-pass amplifier 20. This serves to stabilize the gain of the synchronizing bursts as well as the gain of the chrominance signal, both of which are translated by the common amplifier 20. In this manner, the operating point of the phase detector 40 might be represented by the operating point $P_1$ of the Fig. 2 graph. If the chrominance-signal gain should be undesirably decreased, for example, when the color-television receiver is tuned to a different picture channel because of the nonuniform response characteristics of the antenna system 10, 11, then the resulting negative polarity ACC bias developed by the phase detector 40 is decreased. This, in turn, serves to increase the gain of the band-pass amplifier 20 so as to bring the signal gain back toward the desired value.

A particular advantage of the ACC system of the present invention occurs when the APC loop is not operating in synchronism with the received synchronizing bursts. In this case, the ACC bias potential falls to zero. As a result, the band-pass amplifier 20 is caused to have a maximum gain. This enables synchronizing bursts of maximum amplitude to be supplied to the phase detector 28 of the APC loop. At this time, the operating point might, for example, be represented by the point $P_2$ of the Fig. 2 graph. This increased burst amplitude supplied to the APC loop increases the sensitivity of the APC loop which, in turn, enables the loop to pull the oscillator 31 into synchronism rapidly. At the instant the oscillator 31 is pulled into synchronism, the ACC bias reappears at the common point 50 and the operating point shifts to the point $P_3$ of the Fig. 2 graph. Subsequently, the degenerative control action of the ACC bias reduces such bias back to the value corresponding to the operating point $P_1$ of Fig. 2.

In this manner, the ACC system of the present invention might be termed a "synchronous" or "two-mode" ACC system because it is operative when the APC loop is in synchronism and is effectively disabled when the APC loop is out of synchronism. As mentioned, this in turn produces the desired two-mode operation of the APC loop which is discussed in the mentioned technical articles. Such two-mode operation is obtained because the variations in the operating sensitivity of the APC loop depend on whether the loop is operating in sync or out of sync. This ACC system takes advantage of a property of APC loops described in the aforementioned technical articles wherein the hold-in range may (often substantially) exceed the useful pull-in range.

The output potential of the phase detector 40 might also be additionally utilized to further increase the sensitivity of the APC loop when the loop is operating out of sync. This might be done by using such output potential as a control signal to control the gain of the bufffer amplifier 32 or to control the transmission characteristics of the AUC filter 29. Also, the output potential of the phase detector 40 might be used to control the operation of a color-killer circuit for disabling the chrominance channel when other than a color signal is being received by the television receiver. These latter uses, which are in addition to the use of such potential as an ACC bias, are not shown in the drawings as they are adequately described in the previously mentioned technical articles.

The use of a separate phase detector 40 for the ACC detector also produces an ACC system which is less sensitive to electrical noise. This results from the fact that a balanced phase detector tends to average out electrical noise.

From the foregoing description of the representative embodiment of the invention, it will be apparent that an automatic-chrominance-control system constructed in accordance with the present invention represents a system which not only produces the desired gain-control action but also serves to improve the performance of the automatic-phase-control system, thereby to obtain the double advantage of stalized chrominance-signal gain and more reliable color picture quality due to the increased reliability of the locally generated reference signals which control the demodulation of the chrominance signal.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Two-mode signal-translating apparatus for use in the chrominance-signal decoder of a color-television receiver, the apparatus comprising: a chrominance-signal channel for translating a received chrominance signal including the subcarrier synchronizing bursts; an automatic-phase-control loop coupled to the channel and responsive to the subcarrier synchronizing bursts and including a controlled oscillator circuit for generating a subcarrier reference signal in synchronism with the bursts; a synchronous phase detector coupled to both the chrominance-signal channel and the oscillator circuit for combining the synchronizing bursts and the reference signal to develop a control potential representative of the burst amplitude during an in-sync operating mode which occurs when the oscillator circuit is in synchronism with the bursts and to develop substantially no control potential during an out-of-sync operating mode which occurs when the oscillator circuit is not in synchronism with the bursts; and circuit means for coupling the output of the phase detector back to the chrominance-signal channel to control its gain so that the control potential developed during the in-sync operating mode serves to stabilize the gain of the chrominance signal and the absence of any substantial control potential during the out-of-sync operating mode serves to increase the sensitivity of the automatic-phase-control loop by enabling the chrominance-signal channel to supply thereto subcarrier synchronizing bursts of increased amplitude.

2. Two-mode signal-translating apparatus for use in the chrominance-signal decoder of a color-television receiver, the apparatus comprising: a chrominance-signal channel for translating a received chrominance signal including the subcarrier synchronizing bursts; a gated amplifier circuit coupled to the chrominance-signal channel for separating and translating the subcarrier synchronizing bursts; an automatic-phase-control loop coupled to the output of the gated amplifier circuit and responsive to the subcarrier synchronizing bursts and including a controlled oscillator circuit for generating a subcarrier reference signal in synchronism with the bursts; a synchronous phase detector coupled to both the gated amplifier circuit and the oscillator circuit for combining the synchronizing bursts and the reference signal to develop a control potential representative of the burst amplitude during an in-sync operating mode which occurs when the oscillator circuit is in synchronism with the bursts and to develop substantially no control potential during an out-of-sync operating mode which occurs when the oscillator circuit is not in synchronism with the bursts; and circuit means for coupling the output of the phase detector back to the chrominance-signal channel to control its gain so that the control potential developed during the in-sync operating mode serves to stabilize the gain of the chrominance signal and the absence of any substantial control potential during the out-of-sync operating mode serves to increase the sensitivity of the automatic-phase-control loop by enabling the chrominance-signal channel to supply thereto subcarrier synchronizing bursts of increased amplitude.

3. Two-mode signal-translating apparatus for use in the chrominance-signal decoder of a color-television receiver, the apparatus comprising: a chrominance-signal channel for translating a received chrominance signal including the subcarrier synchronizing bursts; an automatic-phase-control loop coupled to the channel and responsive to the subcarrier synchronizing bursts and including a controlled oscillator circuit for generating a subcarrier reference signal the phase axis and frequency of which are substantially identical to the phase axis and frequency of the bursts when the oscillator circuit is in synchronism with the bursts; a synchronous phase detector coupled to both the chrominance-signal channel and the oscillator circuit for combining the synchronizing bursts and the reference signal to develop a control potential representative of the burst amplitude during an in-sync operating mode which occurs when the oscillator circuit is in synchronism with the bursts and to develop substantially no control potential during an out-of-sync operating mode which occurs when the oscillator circuit is not in synchronism with the bursts; and circuit means for coupling the output of the phase detector back to the chrominance-signal channel to control its gain so that the control potential developed during the in-sync operating mode serves to stabilize the gain of the chrominance signal and the absence of any substantial control potential during the out-of-sync operating mode serves to increase the sensitivity of the automatic-phase-control loop by enabling the chrominance-signal channel to supply thereto subcarrier synchronizing bursts of increased amplitude.

4. Two-mode signal-translating apparatus for use in the chrominance-signal decoder of a color-television receiver, the apparatus comprising: a chrominance-signal channel for translating a received chrominance signal including the subcarrier synchronizing bursts; an automatic-phase-control loop included in the chrominance-signal decoder for controlling demodulation of the chrominance signal, the loop including a first phase detector, a reactance tube, and a controlled oscillator circuit for generating a pair of quadrature-phased subcarrier reference signals, the phase detector being responsive to both the subcarrier synchronizing bursts and one of the reference signals to hold this reference signal in phase quadrature with the synchronizing bursts, the phase axis and frequency of the second reference signal being thereby held substantially identical to the phase axis and frequency of the synchronizing bursts; a second phase detector coupled to both the chrominance-signal channel and the oscillator circuit for combining the synchronizing bursts and the second reference signal to develop a control potential representative of the burst amplitude during an in-sync operating mode which occurs when the oscillator circuit is in synchronism with the bursts and to develop substantially no control potential during an out-of-sync operating mode which occurs when the oscillator circuit is not in synchronism with the bursts; and circuit means for coupling the output of the second phase detector back to the chrominance-signal channel to control its gain so that the control potential developed during the in-sync operating mode serves to stabilize the gain of the chrominance signal and the absence of any substantial control potential during the out-of-sync operating mode serves to increase the sensitivity of the automatic-phase-control loop by enabling the chrominance-signal channel to supply thereto subcarrier synchronizing bursts of increased amplitude.

5. Two-mode signal-translating apparatus for use in the chrominance-signal decoder of a color-television receiver, the apparatus comprising: a chrominance-signal channel for translating a received chrominance signal including the subcarrier synchronizing bursts; an automatic-phase-control loop coupled to the channel and responsive to the subcarrier synchronizing bursts and including a controlled oscillator circuit for generating a subcarrier reference signal in synchronism with the bursts; a synchronous phase detector circuit including a pair of envelope detector circuits coupled in phase opposition and individually responsive to both the bursts and the reference signal for developing at a point common to both envelope detector circuits a direct-current control potential representative of the burst amplitude during an in-sync operating mode which occurs when the oscillator circuit is in synchronism with the bursts and to develop substantially no direct-current control potential during an out-of-sync operating mode which occurs when the oscillator circuit is not in synchronism with the bursts; and circuit means for coupling the output of the phase detector back to the chrominance-signal channel to control its gain so that the direct-current control potential developed during the in-sync operating mode serves to stabilize the gain of the chrominance signal and the absence of any substantial direct-current control potential during the out-of-sync operating mode serves to increase the sensitivity of the automatic-phase-control loop by enabling the chrominance-signal channel to supply thereto subcarrier synchronizing bursts of increased amplitude.

6. Two-mode signal-translating apparatus for use in the chrominance-signal decoder of a color-television receiver, the apparatus comprising: a chrominance-signal channel for translating a received chrominance signal including the subcarrier synchronizing bursts; an automatic-phase-control loop coupled to the channel and responsive to the subcarrier synchronizing bursts and including a controlled oscillator circuit for generating a subcarrier reference signal in synchronism with the bursts; a synchronous phase detector coupled to both the chrominance-signal channel and the oscillator circuit for combining the synchronizing bursts and the reference signal to develop a direct-current control potential representative of the burst amplitude during an in-sync operating mode which occurs when the oscillator circuit is in synchronism with the bursts and to develop substantially no direct-control potential during an out-of-sync operating mode which occurs when the oscillator circuit is not in synchronism with the bursts; and circuit means including a low-pass filter for coupling the direct-current output of the phase detector back to the chrominance-signal channel to control its gain so that the direct-current control potential developed during the in-sync operating mode serves to stabilize the gain of the chrominance signal and the absence of any substantial direct-current control potential during the out-of-sync operating mode serves to increase the sensitivity of the automatic-phase-control loop by enabling the chrominance signal channel to supply thereto subcarrier synchronizing bursts of increased amplitude.

7. Two-mode signal-translating apparatus for use in the chrominance-signal decoder of a color-television receiver, the apparatus comprising: a chrominance-signal amplifier for translating a received chrominance signal including the subcarrier synchronizing bursts; a gated amplifier circuit coupled to the output of the chrominance-signal amplifier for separating and translating the sub-carrier synchronizing bursts; an automatic-phase-control loop included in the chrominance-signal decoder for controlling demodulation of the chrominance signal, the loop being coupled to the output of the gated amplifier circuit and including a first phase detector, a reactance tube, and a controlled oscillator circuit for generating a pair of quadrature-phased subcarrier reference signals, the phase detector being responsive to both the subcarrier synchronizing bursts and one of the reference signals to hold this reference signal in phase quadrature with the synchronizing bursts, the phase axis and frequency of the second reference signal being thereby held substantially identical to the phase axis and frequency of the synchronizing bursts; a second phase detector coupled to both the gated amplifier circuit and the oscillator circuit and including a pair of envelope detector circuits coupled in phase opposition and individually responsive to both the bursts and the second reference signal for developing at a point common to both envelope detector circuits a direct-current control potential representative of the burst amplitude during an in-sync operating mode which occurs when the oscillator circuit is in synchronism with the bursts and to develop substantially no direct-current control potential during an out-of-sync operating mode which occurs when the oscillator circuit is not in synchronism with the bursts; and circuit means including a low-pass filter for coupling the direct-current output of the second phase detector back to the chrominance-signal amplifier to control its gain so that the direct-current control potential developed during the in-sync operating mode serves to stabilize the gain of the chrominance signal and the absence of any substantial direct-current control potential during the out-of-sync operating mode serves to increase the sensitivity of the automatic-phase-control loop by enabling the chrominance-signal amplifier to supply thereto subcarrier synchronizing bursts of increased amplitude.

References Cited in the file of this patent

UNITED STATES PATENTS

| | | |
|---|---|---|
| 2,757,229 | Larkey | July 31, 1956 |
| 2,798,900 | Bradley | July 9, 1957 |

OTHER REFERENCES

RCA Color Television Receiver Model 700–CTC5N, March 1956, page 85. (Copy in Division 41.)